(12) United States Patent
Peng

(10) Patent No.: US 11,680,676 B2
(45) Date of Patent: Jun. 20, 2023

(54) BRACKET

(71) Applicant: PRIMAX ELECTRONICS LTD., Taipei (TW)

(72) Inventor: Hsien-Cheng Peng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/648,189

(22) Filed: Jan. 18, 2022

(65) Prior Publication Data
US 2023/0160521 A1    May 25, 2023

(30) Foreign Application Priority Data

Nov. 23, 2021   (TW) .................................. 110143543
Jan. 6, 2022    (TW) .................................. 111100565

(51) Int. Cl.
*F16M 11/04*    (2006.01)
*F16M 11/20*    (2006.01)

(52) U.S. Cl.
CPC ......... *F16M 11/2014* (2013.01); *F16M 11/04* (2013.01); *F16M 11/2035* (2013.01); *F16M 2200/024* (2013.01); *F16M 2200/028* (2013.01); *F16M 2200/08* (2013.01)

(58) Field of Classification Search
CPC ............... F16M 11/2014; F16M 11/04; F16M 11/2035; F16M 2200/024; F16M 2200/028; F16M 2200/08; F16M 11/06; F16M 11/18; F16M 11/10; F16M 13/02; F16M 13/022; H04N 5/225; G03B 17/561; G08B 13/1963
See application file for complete search history.

(56) References Cited

U.S. PATENT DOCUMENTS

| | | | |
|---|---|---|---|
| 6,290,568 B1* | 9/2001 | Hou ................... | G08B 13/1963 446/228 |
| 11,091,103 B2* | 8/2021 | Winkler ................ | B60R 11/06 |
| 2016/0356415 A1* | 12/2016 | Moore ............... | F16M 11/2064 |
| 2019/0368653 A1* | 12/2019 | Olinger ................ | F16M 11/041 |

* cited by examiner

*Primary Examiner* — Terrell L McKinnon
*Assistant Examiner* — Jerry Olivier
(74) *Attorney, Agent, or Firm* — WPAT, P.C

(57) ABSTRACT

A bracket includes a fixing seat, an adapter seat, a first clamping block, a second clamping block, a first clamping piece, a second clamping piece, a main screw and a position-limiting element. The fixing seat includes a first protrusion post. The adapter seat includes a second protrusion post. The first clamping block includes a first through-hole and a first pivot hole. The second clamping block including a first tapped hole and a second pivot hole. The first clamping piece includes a first clamping part and a first pivotal shaft. The first pivotal shaft is inserted into the first pivot hole. The second clamping piece includes a second clamping part and a second pivotal shaft. The second pivotal shaft is inserted into the second pivot hole. The main screw is penetrated through the first through-hole and then tightened into the second tapped hole.

10 Claims, 16 Drawing Sheets

BRACKET

FIELD OF THE INVENTION

The present invention relates to a bracket, and more particularly to a bracket for installing a monitoring device.

BACKGROUND OF THE INVENTION

Generally, a monitoring device is installed on a bracket. In order to adjust the installation orientation or angle of the monitoring device, it is necessary to loosen plural screws. After the screws are loosened, the installation orientation or angle of the monitoring device can be adjusted. However, this adjustment mechanism is too complicated. Moreover, during the adjustment process, the bracket is readily suffered from disintegration. Under this circumstance, the problem of causing the monitoring device to fall down to the ground occurs.

SUMMARY OF THE INVENTION

For solving the drawbacks of the conventional technologies, the present invention provides a bracket. A monitoring device is installed on a wall surface or an object through the bracket. By loosening a main screw of the bracket, the orientation or angle of the monitoring device can be adjusted. The bracket is further equipped with a protecting mechanism. Consequently, during the process of adjusting the orientation or angle of the monitoring device, the bracket is not suffered from disintegration.

In accordance with an aspect of the present invention, a bracket is provided. The bracket includes a fixing seat, an adapter seat, a first clamping block, a second clamping block, a first clamping piece, a second clamping piece, a main screw and a position-limiting element. The fixing seat includes a first protrusion post and a first base. The adapter seat includes a second protrusion post and a second base. The first clamping block includes a first through-hole and a first pivot hole. The second clamping block including a first tapped hole and a second pivot hole. Moreover, a clamping space is defined by the first clamping block and the second clamping block collaboratively. The first clamping piece is disposed within the clamping space. The first clamping piece includes a first clamping part and a first pivotal shaft. The first pivotal shaft is inserted into the first pivot hole. The second clamping piece is disposed within the clamping space. The second clamping piece includes a second clamping part and a second pivotal shaft. The second pivotal shaft is inserted into the second pivot hole. The main screw is penetrated through the first through-hole and tightened into the first tapped hole. The main screw includes a head part, a thread part and a limiting part. The thread part is arranged between the head part and the limiting part. When the position-limiting element is locked on the limiting part of the main screw, the main screw is not detached from the first tapped hole. The first protrusion post is clamped between the first clamping block and the second clamping block. The second protrusion post is clamped between the first clamping part and the second clamping part.

In an embodiment, after the limiting part of the main screw is penetrated through the first tapped hole, the limiting part of the main screw is exposed outside the second clamping block.

In an embodiment, the limiting part of the main screw is a ring-shaped recess, and the position-limiting element is an E-shaped locking ring.

In an embodiment, the limiting part of the main screw is an insertion hole, and the position-limiting element is a bar.

In an embodiment, the bracket further includes a positioning clip, the first protrusion post includes a ring-shaped groove, and the first clamping block includes a positioning structure. The ring-shaped groove is locked between the positioning clip and the positioning structure.

In an embodiment, the positioning structure includes two second tapped holes, and the positioning clip comprises an arc-shaped main body and two fastening part. The two fastening parts are respectively located at two ends of the arc-shaped main body. Each fastening part includes a second through-hole. After two screws are respectively penetrated through the corresponding second through-holes and tightened into the corresponding second tapped holes, the ring-shaped groove is locked between the positioning clip and the positioning structure.

In an embodiment, the bracket further includes a sliding block that is sheathed around the first protrusion post, and the sliding block includes a slant surface and a first saw-tooth structure. The first base includes a second saw-tooth structure. The second clamping block further includes a guiding structure. The slant surface of the sliding block is contacted with the guiding structure. When the thread part of the main screw is tightened into the first tapped hole, the first saw-tooth structure and the second saw-tooth structure are engaged with each other. When the thread part of the main screw is not tightened into the first tapped hole, the first saw-tooth structure and the second saw-tooth structure are disengaged from each other.

In an embodiment, the second clamping block further includes a third saw-tooth structure, and the third saw-tooth structure is formed on an outer periphery of the second pivot hole. The second clamping piece further includes a fourth saw-tooth structure, and the fourth saw-tooth structure is formed on an outer periphery of the second pivotal shaft. When the thread part of the main screw is tightened into the first tapped hole, the third saw-tooth structure and the fourth saw-tooth structure are engaged with each other. When the thread part of the main screw is not tightened into the first tapped hole, the third saw-tooth structure and the fourth saw-tooth structure are disengaged from each other.

In an embodiment, a fifth saw-tooth structure is formed on an outer surface of the second protrusion post that is contacted with the first clamping piece or the second clamping piece, and a sixth saw-tooth structure is formed on a surface of the first clamping part of the first clamping piece or a surface of the second clamping part of the second clamping piece that is contacted with the second protrusion post. When the thread part of the main screw is tightened into the first tapped hole, the fifth saw-tooth structure and the sixth saw-tooth structure are engaged with each other. When the thread part of the main screw is not tightened into the first tapped hole, the fifth saw-tooth structure and the sixth saw-tooth structure are disengaged from each other.

In an embodiment, the first protrusion post and the second protrusion post are hollow posts, and the first protrusion post and the second protrusion post are in communication with each other through the clamping space.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

The present invention provides a bracket. A monitoring device can be installed on a wall surface or an object through the bracket. Moreover, the installation angle or orientation of the monitoring device can be adjusted through a main screw of the bracket only.

Figure 1:
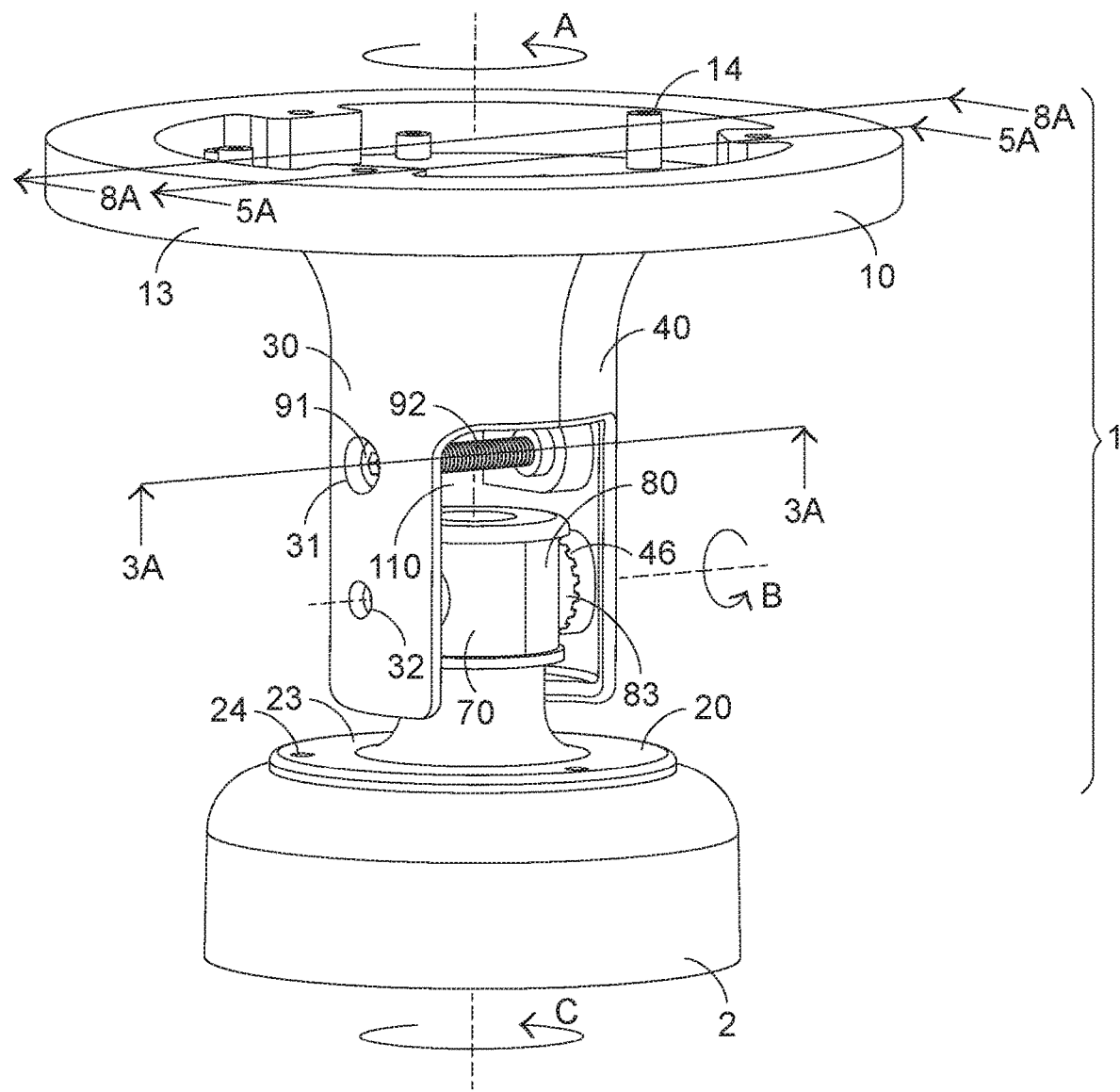
FIG. 1 is a schematic perspective view illustrating a bracket according to an embodiment of the present invention.
Figure 2A:
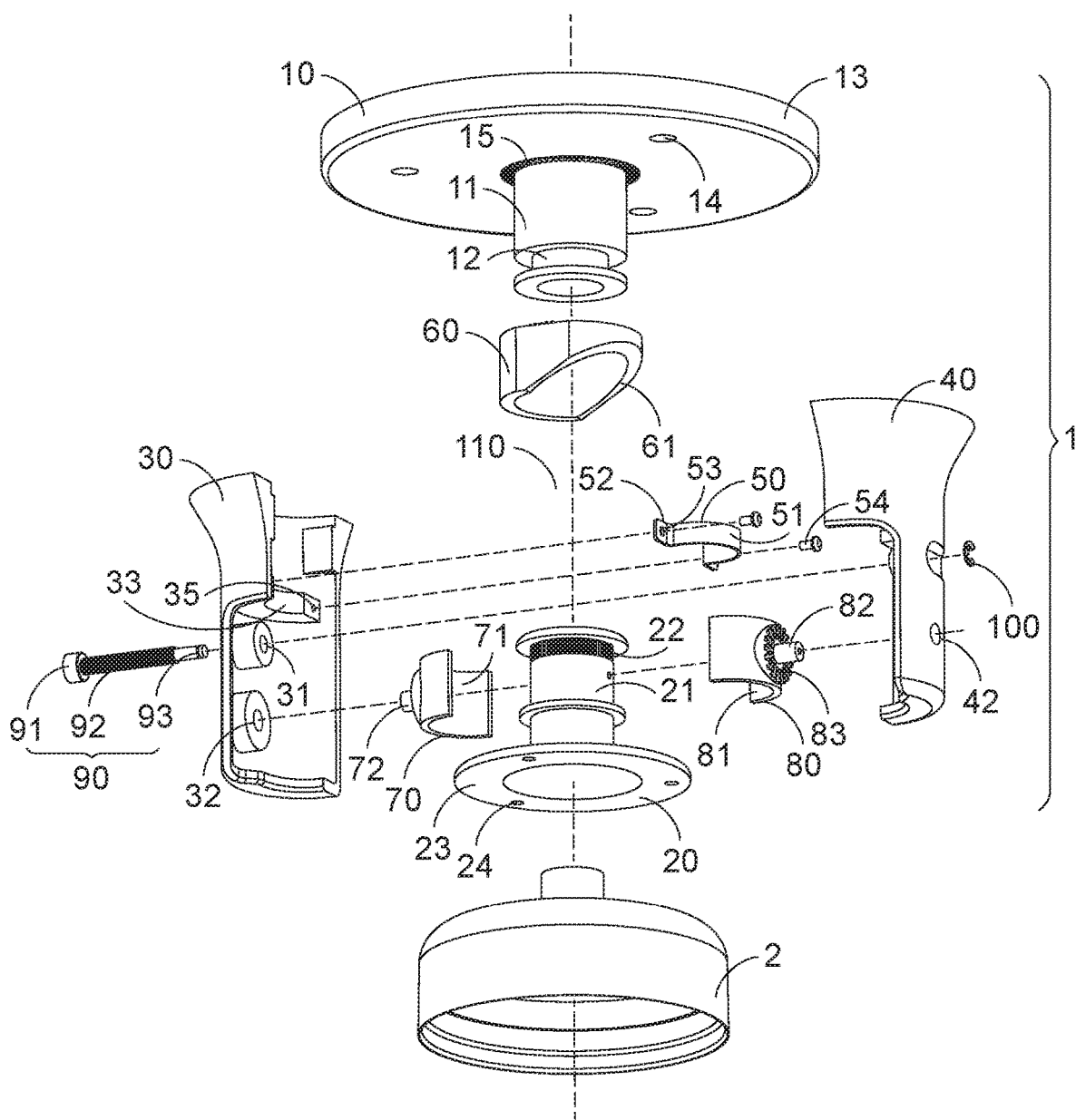
FIG. 2A is a schematic exploded view illustrating the bracket as shown in FIG. 1 and taken along a viewpoint.
Figure 2B:
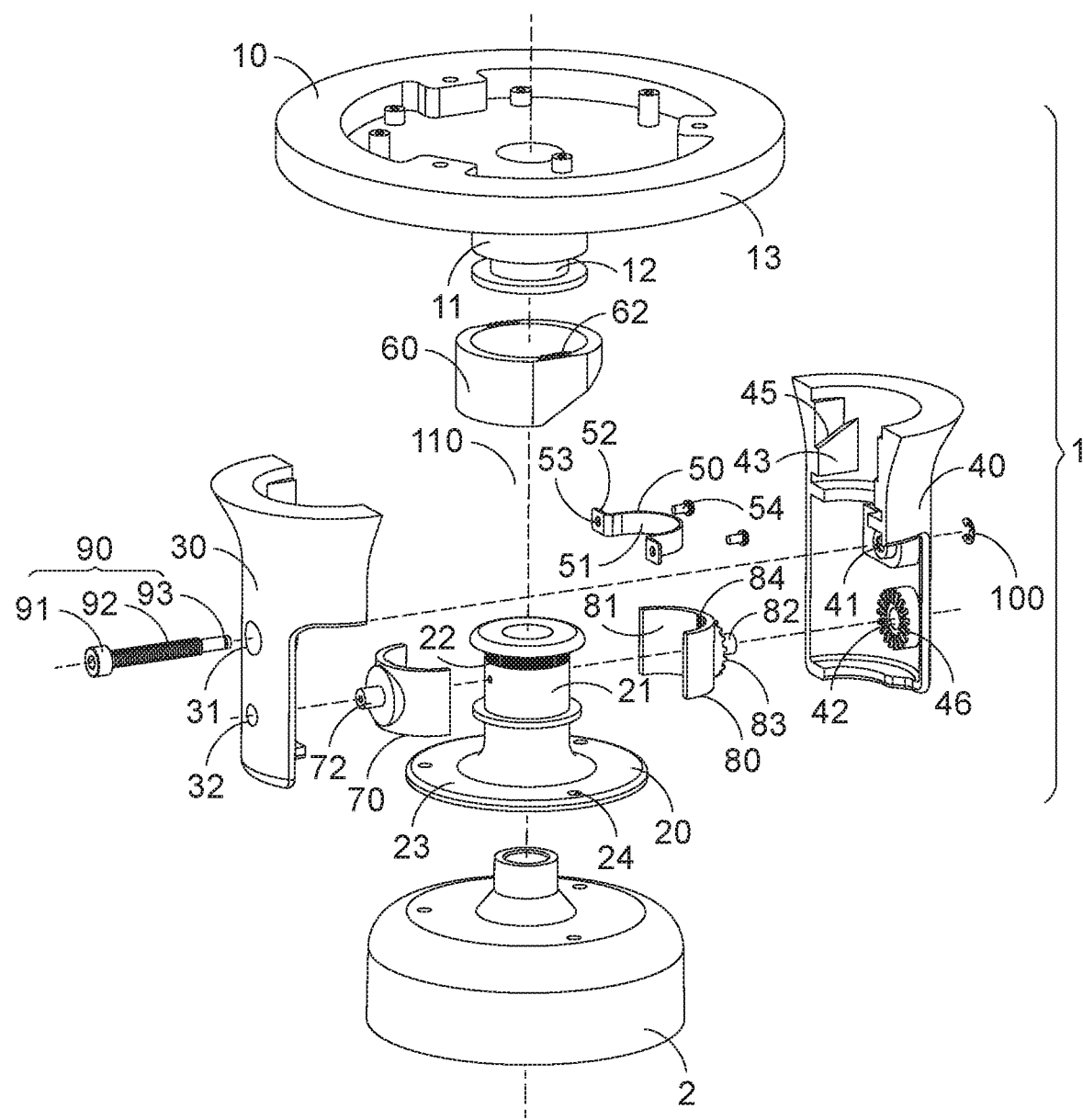
FIG. 2B is a schematic exploded view illustrating the bracket as shown in FIG. 1 and taken along another viewpoint.

FIG. 1 is a schematic perspective view illustrating a bracket according to an embodiment of the present invention. FIG. 2A is a schematic exploded view illustrating the bracket as shown in FIG. 1 and taken along a viewpoint. FIG. 2B is a schematic exploded view illustrating the bracket as shown in FIG. 1 and taken along another viewpoint. As shown in FIGS. 1, 2A and 2B, the bracket 1 comprises a fixing seat 10, an adapter seat 20, a first clamping block 30, a second clamping block 40, a positioning clip 50, a sliding block 60, a first clamping piece 70, a second clamping piece 80, a main screw 90 and a position-limiting element 100.

Figure 4:
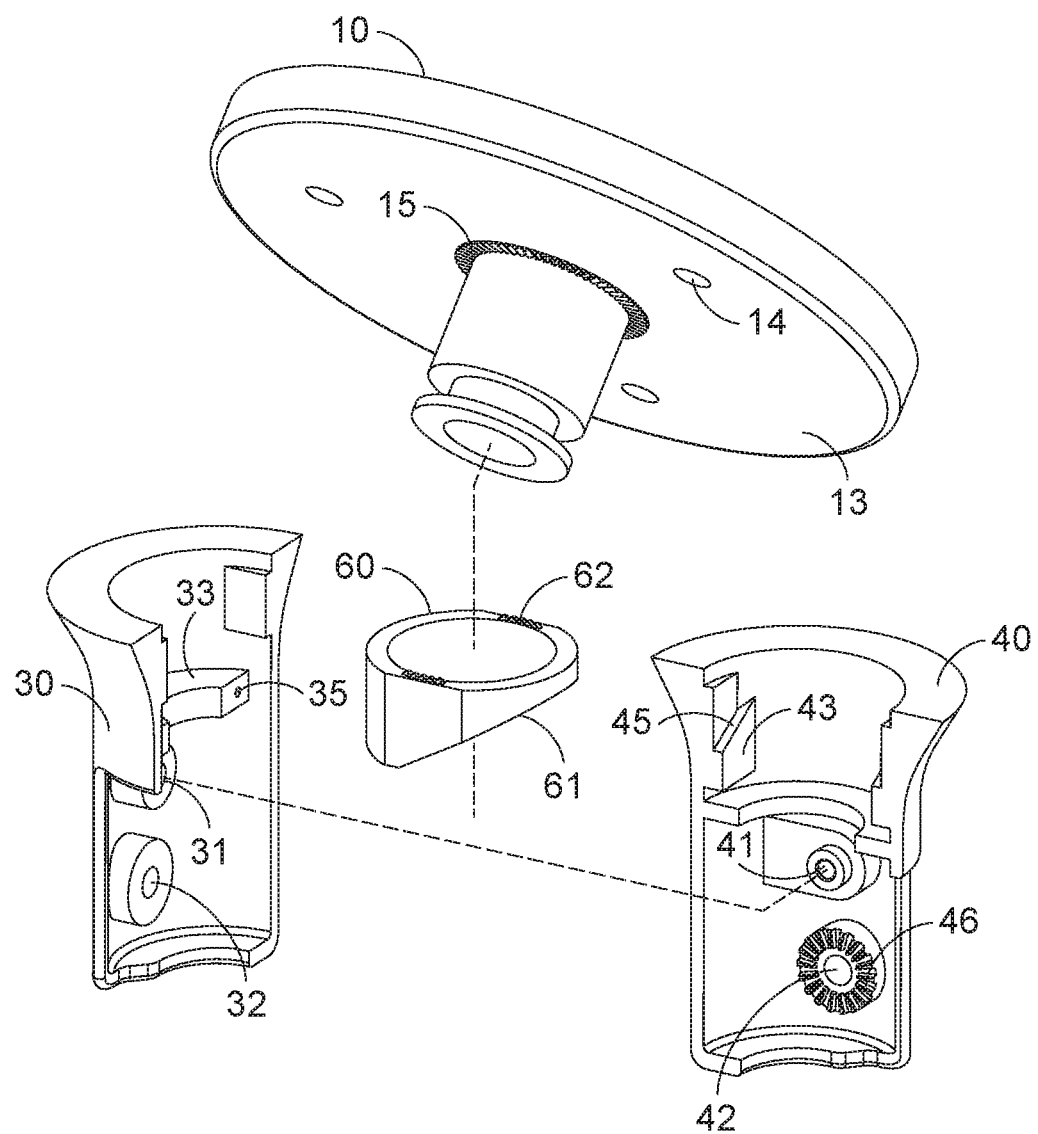
FIG. 4 schematically illustrates the relationship between the fixing seat, the first clamping block, the second clamping block and the sliding block of the bracket according to the embodiment of the present invention.

FIG. 4 schematically illustrates the relationship between the fixing seat, the first clamping block, the second clamping block and the sliding block of the bracket according to the embodiment of the present invention. Please refer to FIGS. 1, 2A, 2B and 4. The fixing seat 10 comprises a first protrusion post 11 and a first base 13. The first protrusion post 11 is a hollow post. The first protrusion post 11 is connected to the first base 13 or externally protruded from the first base 13. As shown in FIG. 2, the first protrusion post 11 is downwardly protruded from the first base 13. The first base 13 is connected to a wall surface (not shown) or an object (not shown). In an embodiment, the first base 13 comprises openings 14. After screws (not shown) are penetrated through the corresponding openings 14 and tightened into the wall surface or the object, the first base 13 is fixed on the wall surface or the object. It is noted that the mechanism of fixing the first base 13 on the wall surface or the object is not restricted. For example, other connecting means or fastening means (e.g., studs or hooks) may be used to fix the first base 13. Moreover, a ring-shaped groove 12 is formed in an outer surface of the first protrusion post 11.

Figure 7:
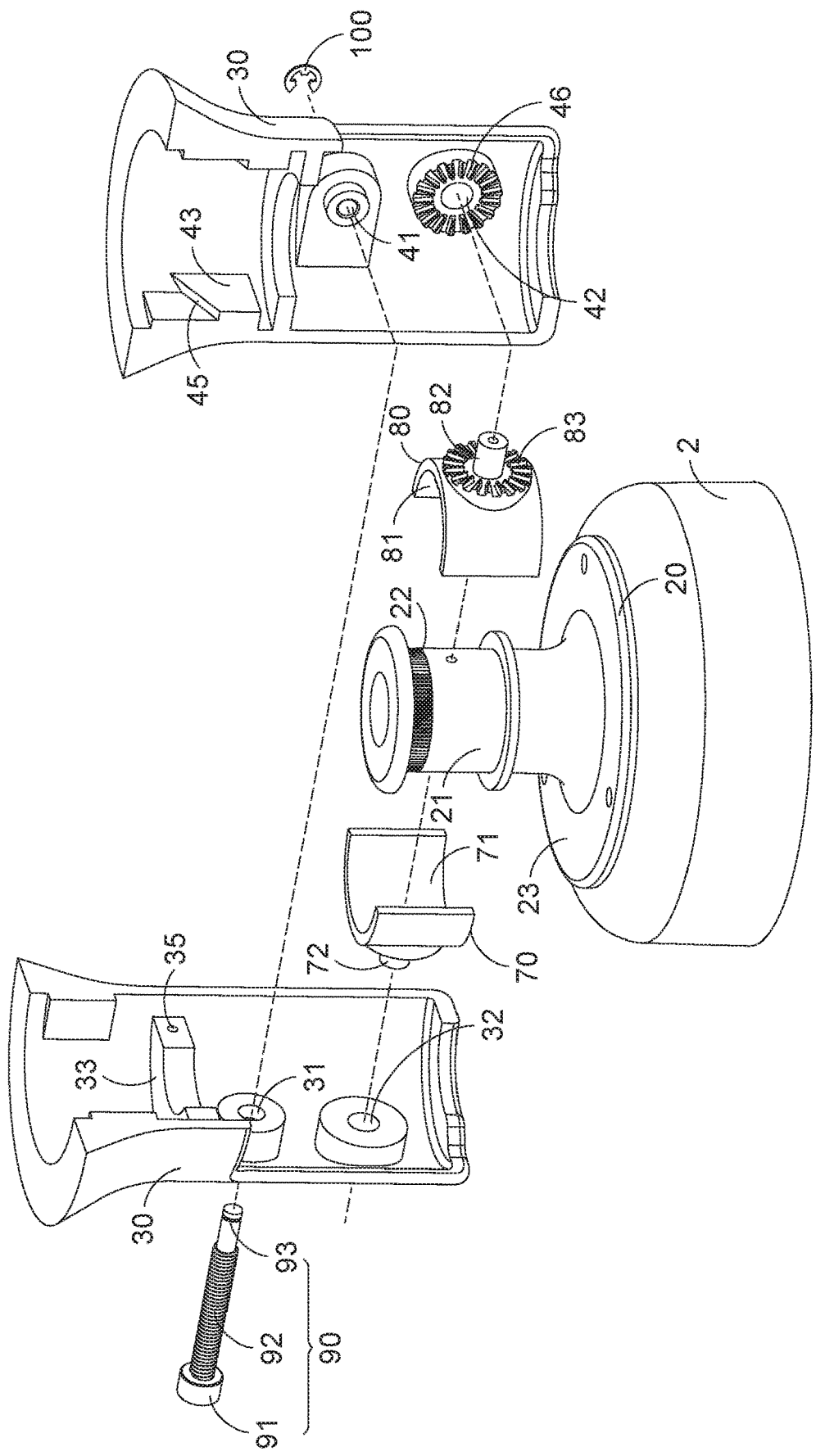
FIG. 7 schematically illustrates the relationship between the adapter seat, the first clamping block, the second clamping block, the first clamping piece, the second clamping piece, the main screw and the position-limiting element of the bracket.
Figure 9:
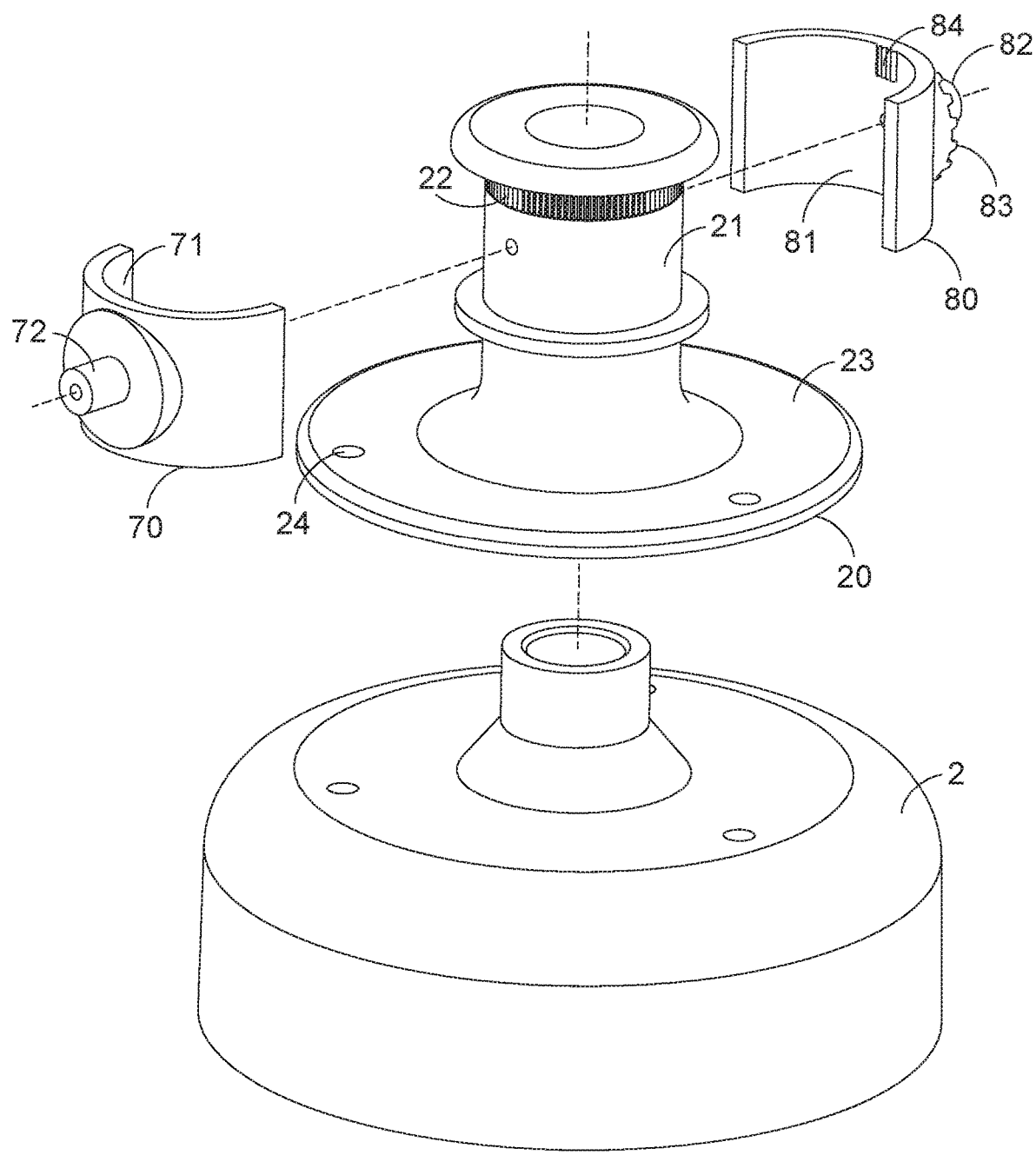
FIG. 9 schematically illustrates the relationship between the adapter seat, the first clamping piece and the second clamping piece of the bracket.

FIG. 7 schematically illustrates the relationship between the adapter seat, the first clamping block, the second clamping block, the first clamping piece, the second clamping piece, the main screw and the position-limiting element of the bracket. FIG. 9 schematically illustrates the relationship between the adapter seat, the first clamping piece and the second clamping piece of the bracket. Please refer to FIGS. 1, 2A, 2B, 7 and 9. The adapter seat 20 comprises a second protrusion post 21 and a second base 23. The second protrusion post 21 is a hollow post. The second protrusion post 21 is connected to the second base 23 or externally protruded from the second base 23. As shown in FIG. 2, the second protrusion post 21 is upwardly protruded from the second base 23. The adapter seat 20 is connected with a monitoring device 2. In an embodiment, the second base 23 comprises openings 24. After screws (not shown) are penetrated through the corresponding openings 24 and tightened into a casing of the monitoring device 2, the second base 23 is fixed on the casing of the monitoring device 2. It is noted that the mechanism of fixing the second base 23 of the adapter seat 20 on the monitoring device 2 or connecting the second base 23 of the adapter seat 20 with the monitoring device 2 is not restricted. For example, other connecting means or fastening means (e.g., studs or hooks) may be used to fix the second base 23. In the embodiment of FIG. 9, the adapter seat 20 is a one-piece structure.

Figure 10:
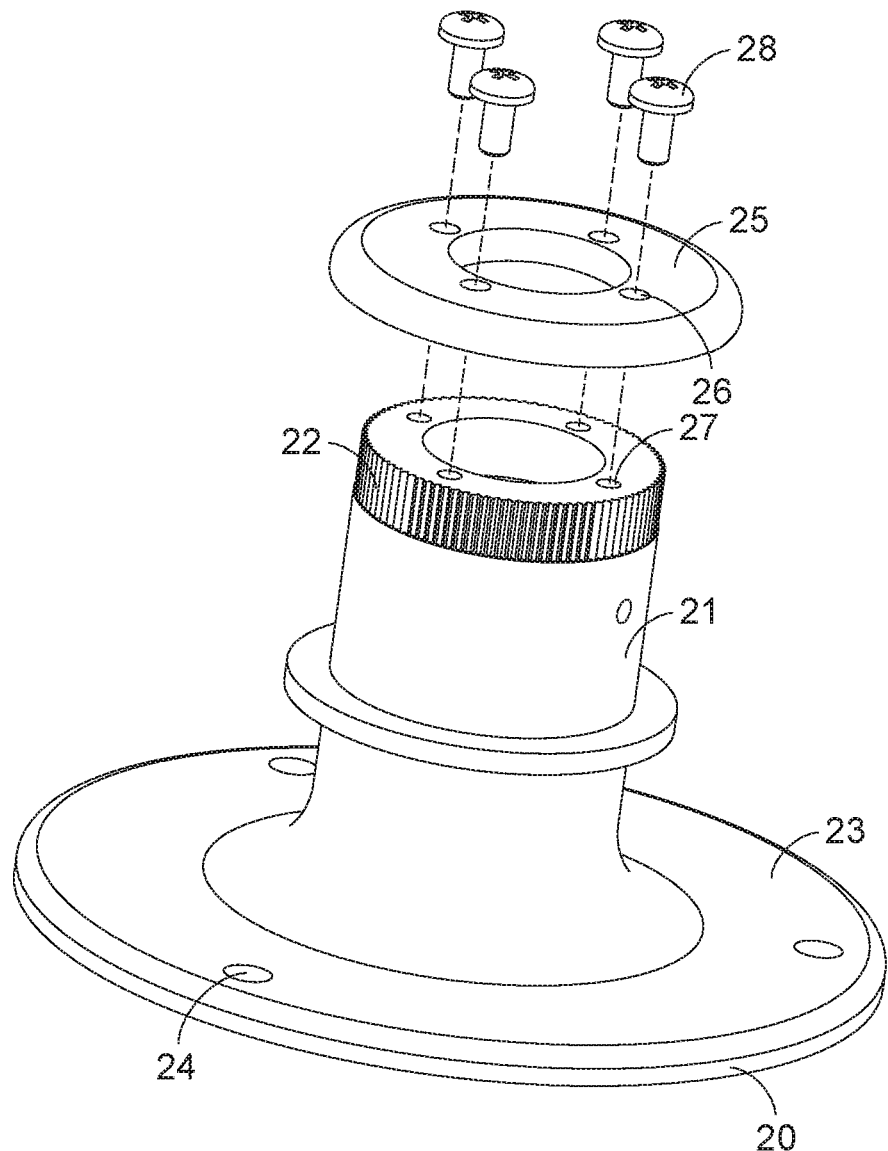
FIG. 10 is a schematic exploded view illustrating another example of the adapter seat of the bracket according to the embodiment of the present invention.

It is noted that the example of the adapter seat is not restricted. FIG. 10 is a schematic exploded view illustrating another example of the adapter seat of the bracket according to the embodiment of the present invention. In this embodiment, the adapter seat 20 is an assembled structure of plural components. As shown in FIG. 10, the adapter seat 20 further comprises a covering member 25 in addition to the second protrusion post 21 and the second base 23. The covering member 25 comprises openings 26. The second protrusion post 21 comprises tapped holes 27 corresponding to the openings 26. After screws 28 are penetrated through the corresponding openings 26 and tightened into the corresponding tapped holes 27, the covering member 25 is fixed on the second protrusion post 21.

Figure 3A:
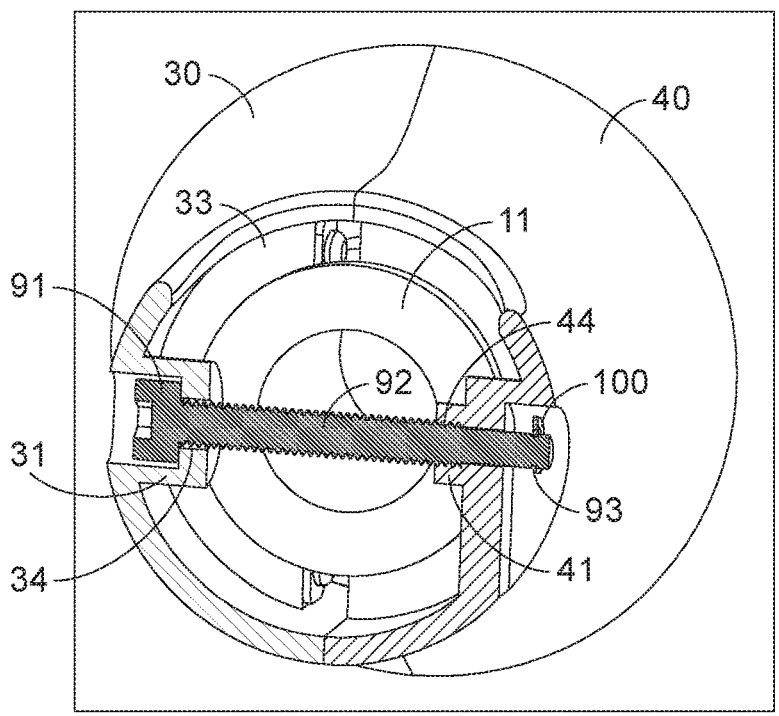
FIG. 3A is a schematic cutaway view illustrating the bracket as shown in FIG. 1 and taken along the line 3A-3A.
Figure 3B:
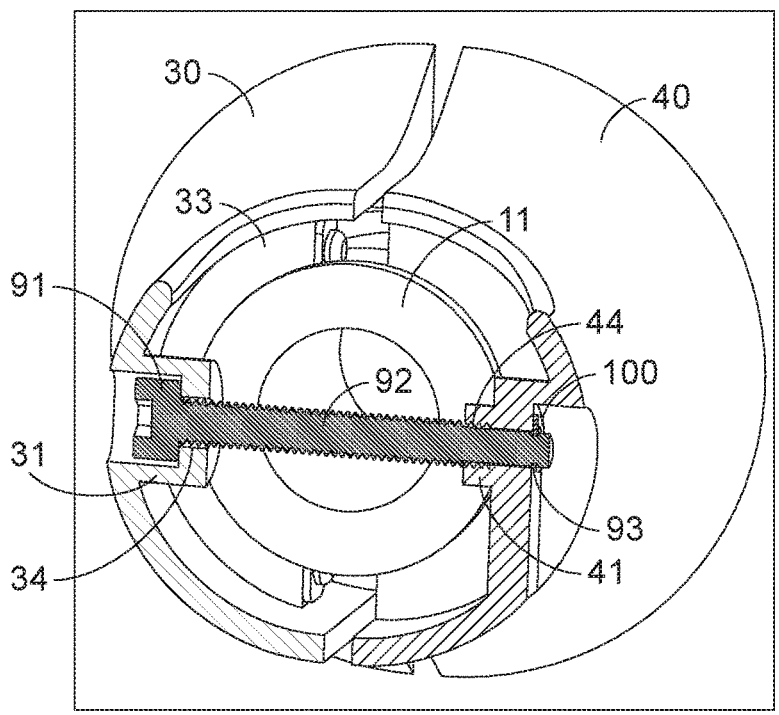
FIG. 3B is a schematic cutaway view illustrating the bracket as shown in FIG. 3A while the bracket is adjusted.

FIG. 3A is a schematic cutaway view illustrating the bracket as shown in FIG. 1 and taken along the line 3A-3A. FIG. 3B is a schematic cutaway view illustrating the bracket as shown in FIG. 3A while the bracket is adjusted. Please refer to FIGS. 1, 2A, 2B, 3A, 3B, 4 and 7. A clamping space 110 is defined by the first clamping block 30 and the second clamping block 40 collaboratively. After the bracket 1 is assembled, the first protrusion post 11 of the fixing seat 10 and the second protrusion post 21 of the adapter seat 20 are clamped between the first clamping block 30 and the second clamping block 40 and disposed within the clamping space 110.

The first clamping block 30 comprises a first through-hole 31, a first pivot hole 32 and a positioning structure 33. The first through-hole 31 has a smooth inner surface 34. The positioning recess 33 is located at the side of the first clamping block 30 facing the clamping space 110. The positioning structure 33 comprises an arc-shaped main body with at least one second tapped hole 35. The second tapped hole 35 has an internal thread structure (not shown).

The second clamping block 40 comprises a first tapped hole 41, a second pivot hole 42 and a guiding structure 43. The first tapped hole 41 is a through-hole with an internal thread structure 44. The guiding structure 43 is located at the side of the second clamping block 40 facing the clamping space 110. Moreover, the guiding structure 43 has an inclined guiding surface 45.

As mentioned above, the first protrusion post 11 and the second protrusion post 21 are hollow posts. Consequently, the first protrusion post 11 and the second protrusion post 21 are in communication with each other through the clamping space 110. The wires for transferring electric power and signals to the monitoring device 2 can be accommodated within the first protrusion post 11 and the second protrusion post 21. In this way, the wires can be penetrated through the whole bracket 1 (e.g., extended from the wall surface or the object to the adapter seat 20 through the fixing seat 10) and connected to the monitoring device 2.

The first clamping piece 70 and the second clamping piece 80 are disposed within the clamping space 110. The first clamping piece 70 and the second clamping piece 80 are configured to clamp the second protrusion post 21 of the adapter seat 20. In addition, the arrangement of the first clamping piece 70 and the second clamping piece 80 can control and limit the rotation of the adapter seat 20. The first clamping piece 70 comprises a first clamping part 71 and a first pivotal shaft 72. The first pivotal shaft 72 is inserted into the first pivot hole 32 of the first clamping block 30. The second clamping piece 80 comprises a second clamping part 81 and a second pivotal shaft 82. The second pivotal shaft 82 is inserted into the second pivot hole 42 of the second clamping block 40. The second protrusion post 21 of the adapter seat 20 is clamped between the first clamping part 71 of the first clamping piece 70 and the second clamping part 81 of the second clamping piece 80.

The main screw 90 comprises a head part 91, a thread part 92 and a limiting part 93. The thread part 92 is arranged between the head part 91 and the limiting part 93. In accordance with a feature of the bracket 1, the first clamping block 30 and the second clamping block 40 can be combined together through the rotation of the main screw 90. When the first clamping block 30 and the second clamping block 40 are combined together, the first protrusion post 11 of the fixing seat 10, the first clamping piece 70, the second protrusion post 21 of the adapter seat 20 and the second clamping piece 80 are clamped between the first clamping block 30 and the second clamping block 40. On the other hand, the first clamping block 30 and the second clamping block 40 can be somewhat separated from each other through the reverse rotation of the main screw 90. When the main screw 90 is rotated reversely, the first clamping block 30 and the second clamping block 40 are detached from each other. At the same time, the first protrusion post 11 of the fixing seat 10, the first clamping piece 70, the second protrusion post 21 of the adapter seat 20 and the second clamping piece 80 clamped between the first clamping block 30 and the second clamping block 40 have rooms to be rotated.

Figure 8A:
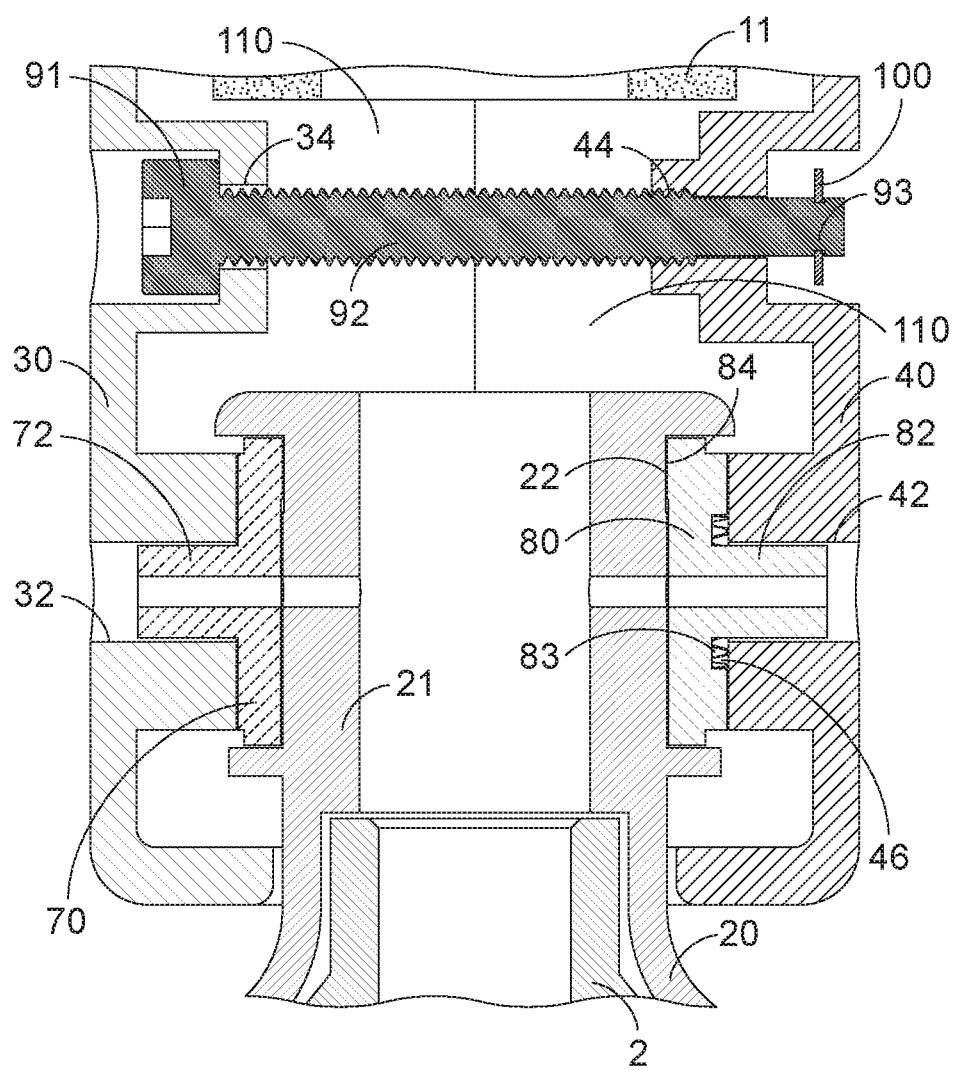
FIG. 8A is a schematic cross-sectional view illustrating the bracket as shown in FIG. 1 and taken along the line 8A-8A.
Figure 8B:
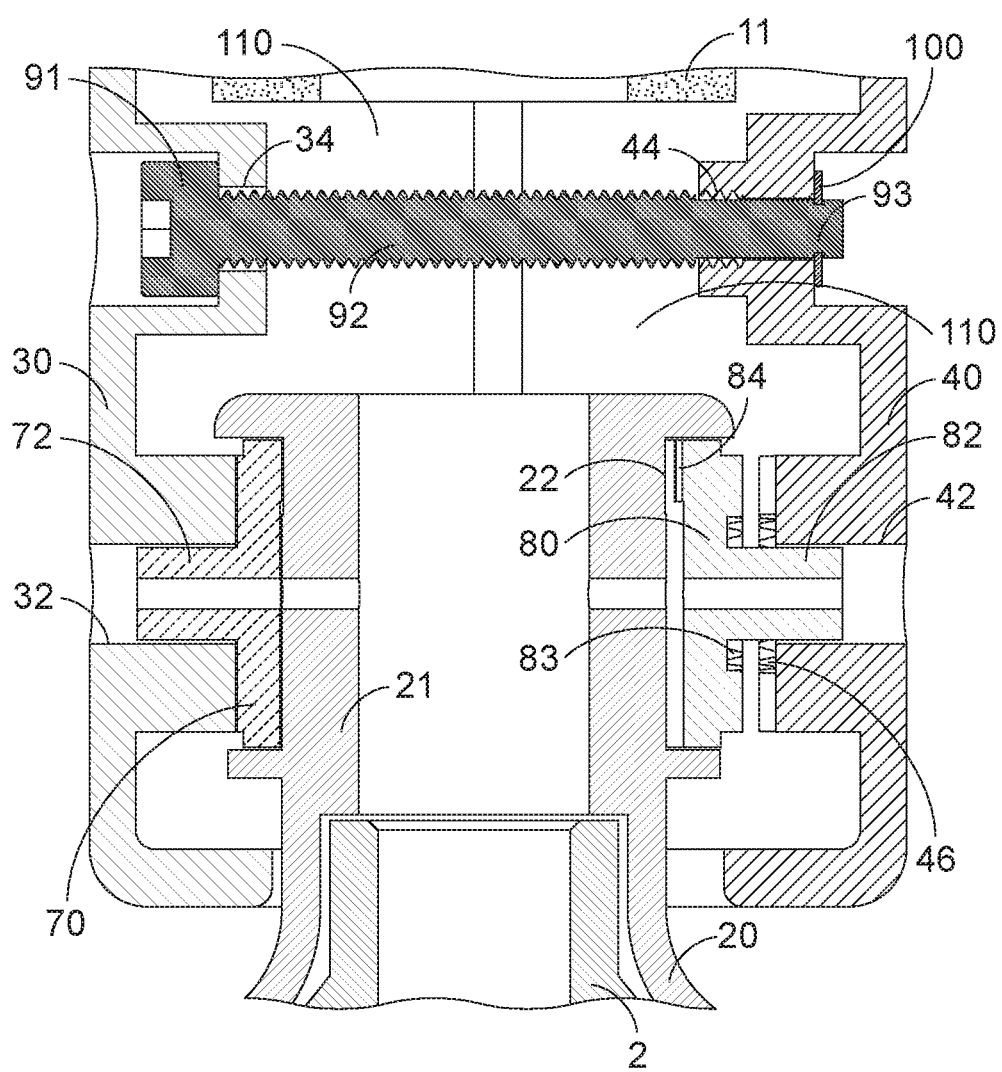
FIG. 8B is a schematic cross-sectional view illustrating the bracket as shown in FIG. 8A while the bracket is adjusted.
Figure 11:
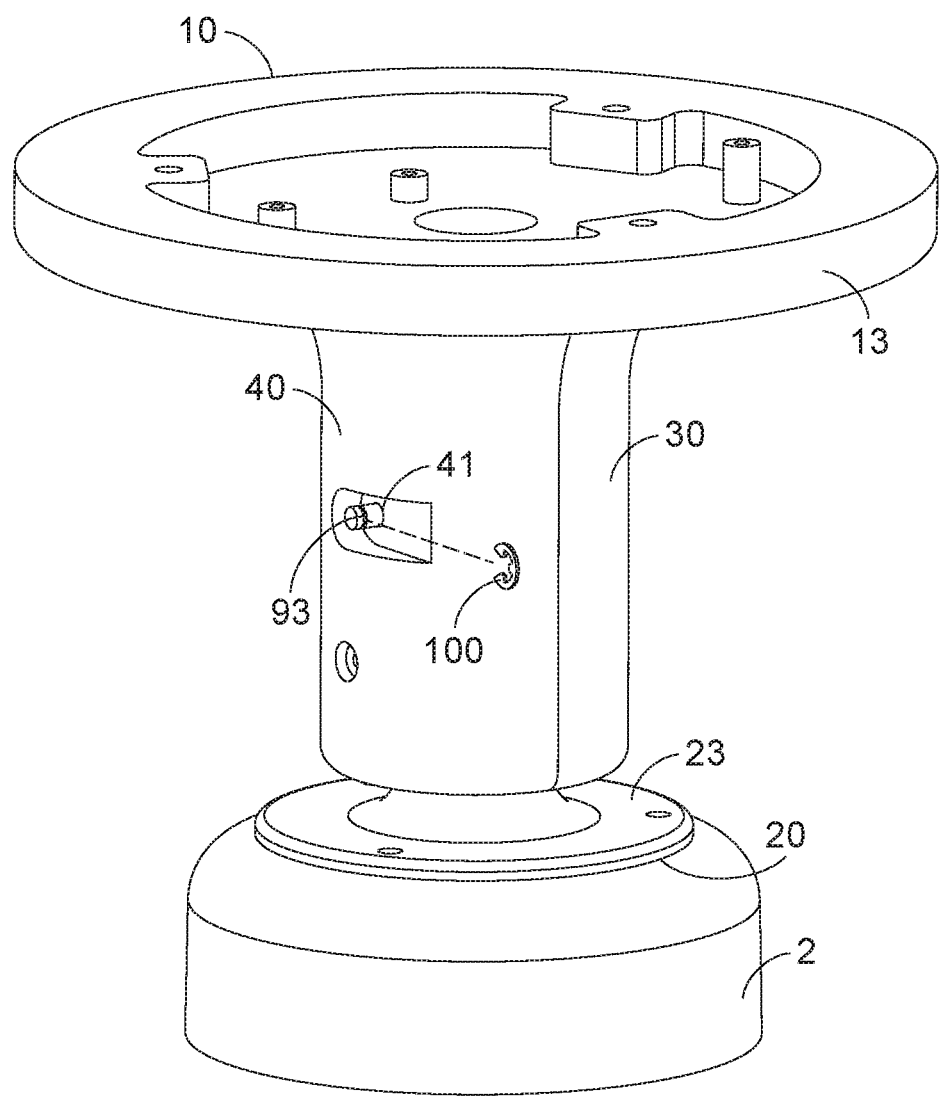
FIG. 11 is a schematic perspective view illustrating the bracket as shown in FIG. 1 and taken along another viewpoint.

FIG. 8A is a schematic cross-sectional view illustrating the bracket as shown in FIG. 1 and taken along the line 8A-8A. FIG. 8B is a schematic cross-sectional view illustrating the bracket as shown in FIG. 8A while the bracket is adjusted. FIG. 11 is a schematic perspective view illustrating the bracket as shown in FIG. 1 and taken along another viewpoint. Please refer to FIGS. 1, 2A, 2B, 3A, 3B, 4, 8A, 8B and 11. When the user rotates the head part 91 of the main screw 90 through a screwdriver or any other appropriate tool, the thread part 92 of the main screw 90 is penetrated through the first through-hole 31 and then tightened into the first tapped hole 41. As a consequence, the thread part 92 of the main screw 90 is engaged with the internal thread structure 44 of the first tapped hole 41. Consequently, the first clamping block 30 and the second clamping block 40 are fixedly combined together and not detached from each other. When the head part 91 of the main screw 90 is reversely rotated by the user, the thread part 92 of the main screw 90 is disengaged from the internal thread structure 44 of the first tapped hole 41 (see FIG. 3B). Under this circumstance, the first clamping block 30 and the second clamping block 40 are detachable from each other. Consequently, there is a room for the user to adjust the angle or orientation of the monitoring device 2.

During the process of adjusting the main screw 90, if the first clamping block 30 and the second clamping block 40 are completely detached from each other, the bracket 1 may be disintegrated or the monitoring device 2 may drop down. For avoiding this problem, the bracket 1 is further equipped with a protecting mechanism. Due to the protecting mechanism, the first clamping block 30 and the second clamping block 40 can be detached from each other to a certain extent, but the first clamping block 30 and the second clamping block 40 will not completed detached from each other. In an embodiment, the protecting mechanism comprises the limiting part 93 of the main screw 90 and the position-limiting element 100. The limiting part 93 and the head part 90 are located at two opposite ends of the main screw 90. Please refer to FIG. 11. During the process of assembling the bracket 1, the limiting part 93 of the main screw 90 is penetrated through the first tapped hole 41 of the second clamping block 40 and then exposed outside the second clamping block 40. Due to this design, the position-limiting element 100 and the limiting part 93 of the main screw 90 are combined together again, and the limiting part 93 is not retracted back to the clamping space 110. Consequently, the purpose of avoiding the complete detachment of the first clamping block 30 and the second clamping block 40 is achieved.

Figure 12A:
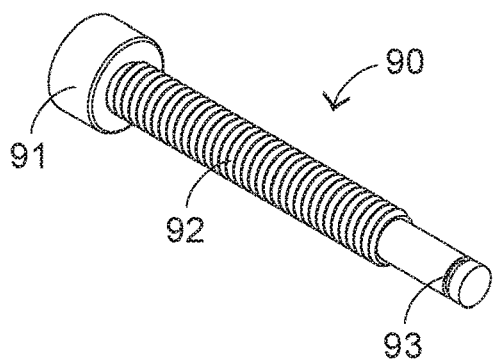
FIG. 12A schematically illustrates the main screw of the bracket.
Figure 12B:
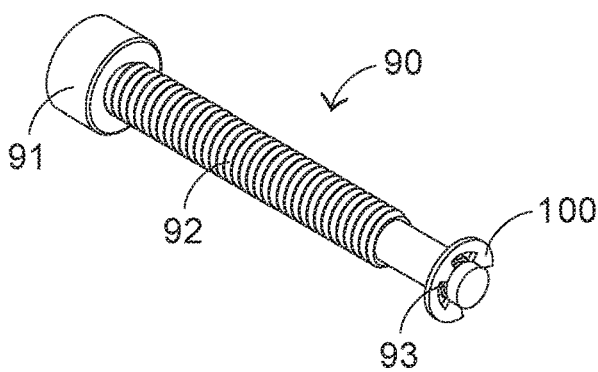
FIG. 12B is a schematic perspective view illustrating the assembled structure of the main screw of FIG. 12A and the corresponding position-limiting element.
Figure 13A:
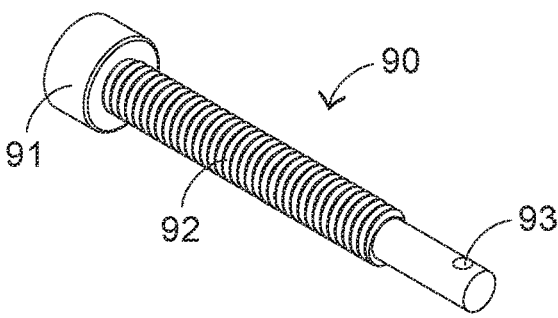
FIG. 13A schematically illustrates a variant example of the main screw of the bracket.
Figure 13B:
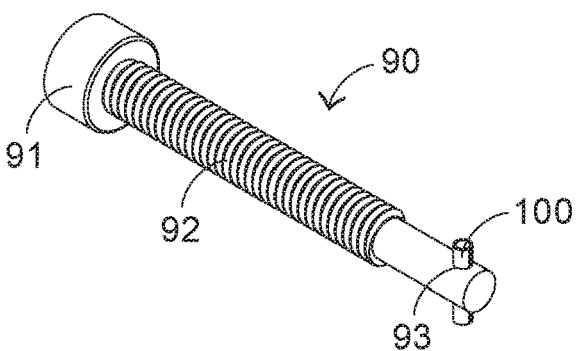
FIG. 13B is a schematic perspective view illustrating the assembled structure of the main screw of FIG. 13A and the corresponding position-limiting element.

FIG. 12A schematically illustrates the main screw of the bracket. FIG. 12B is a schematic perspective view illustrating the assembled structure of the main screw of FIG. 12A and the corresponding position-limiting element. Please refer to FIGS. 1, 2A, 2B, 11, 12A and 12B. In an embodiment of the bracket 1, the limiting part 93 of the main screw 90 is a ring-shaped recess, and the corresponding position-limiting element 100 is an E-shaped locking ring. It is noted that the examples of the limiting part and the position-limiting element are not restricted. FIG. 13A schematically illustrates a variant example of the main screw of the bracket. FIG. 13B is a schematic perspective view illustrating the assembled structure of the main screw of FIG. 13A and the corresponding position-limiting element. In this embodiment, the limiting part 93 of the main screw 90 is an insertion hole, and the corresponding position-limiting element 100 is a bar. After the bar is penetrated through the insertion hole, the limiting part 93 of the main screw 90 is not retracted back to the clamping space 110 (see FIG. 13B). Consequently, the first clamping block 30 and the second clamping block 40 are not completely detached from each other.

Figure 6A:
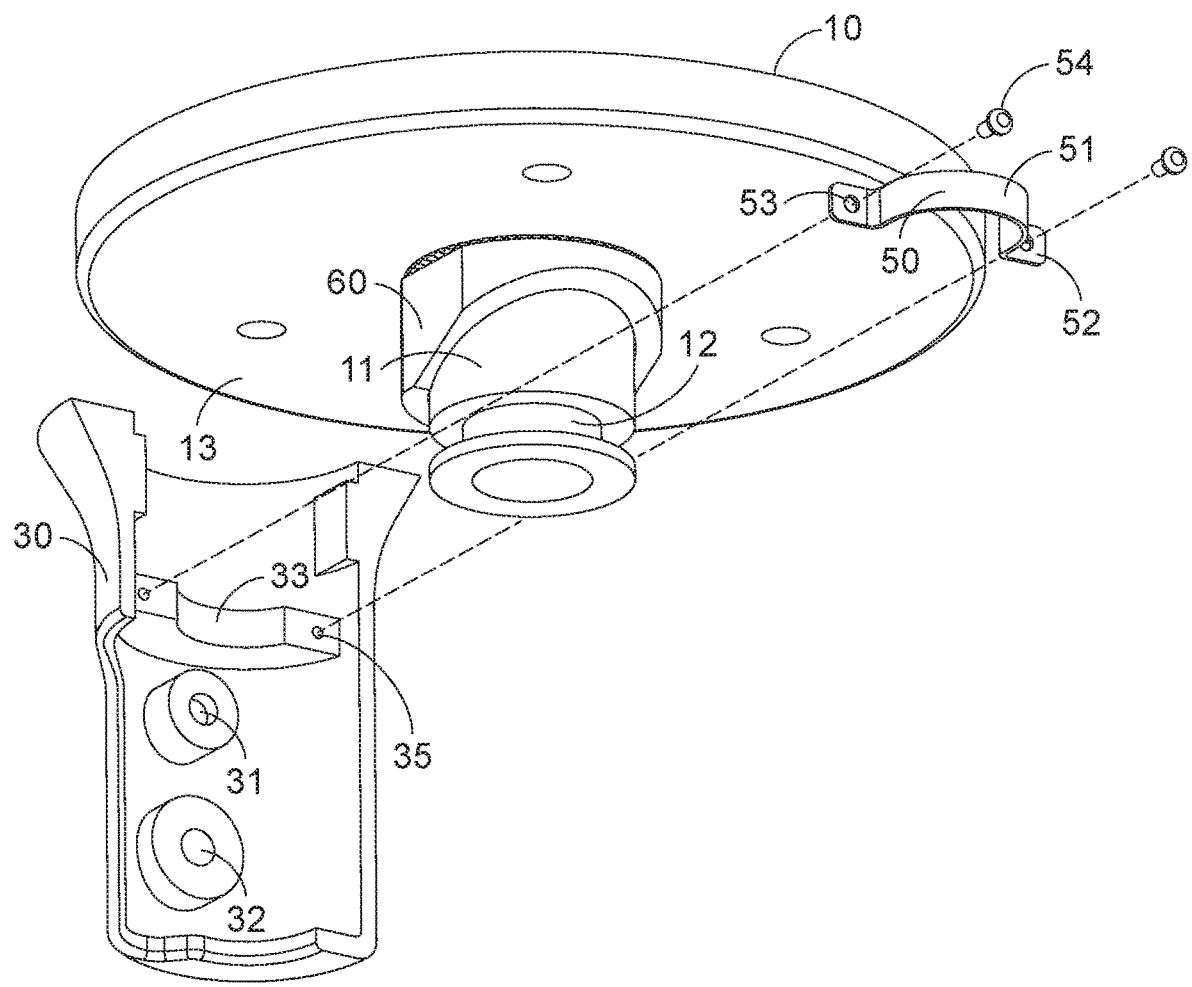
FIG. 6A schematically illustrates the relationship between the fixing seat, the first clamping block and the positioning clip of the bracket according to the embodiment of the present invention.
Figure 6B:
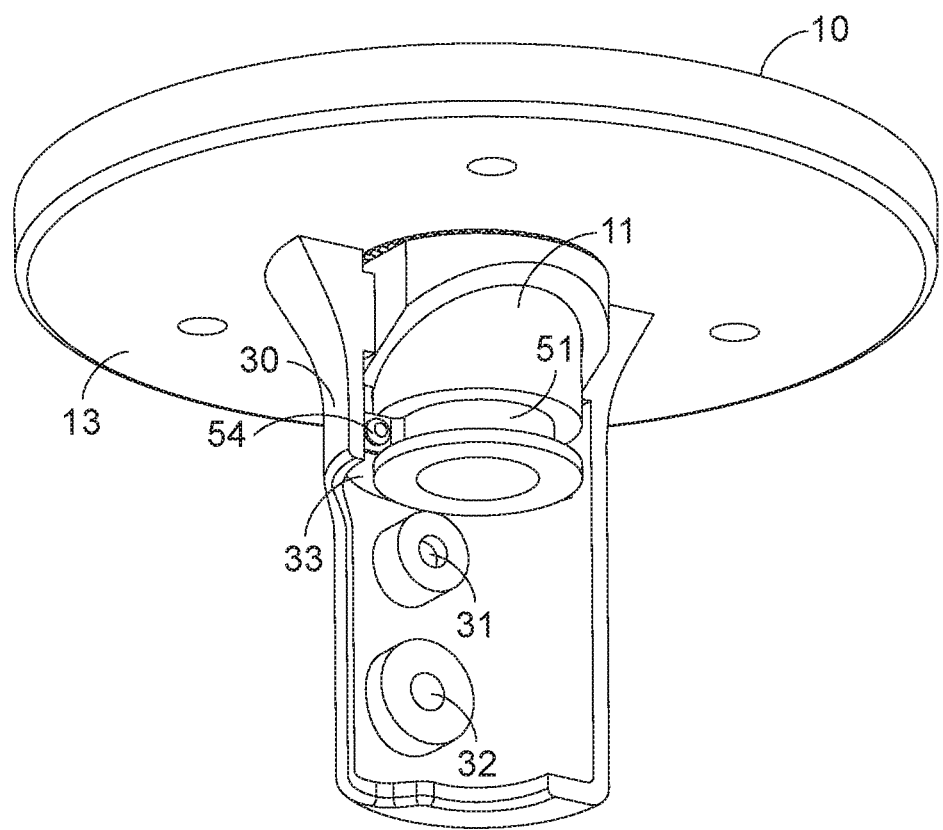
FIG. 6B is a schematic perspective view illustrating the assembled structure of the fixing seat, the first clamping block and the positioning clip as shown in FIG. 6A.

FIG. 6A schematically illustrates the relationship between the fixing seat, the first clamping block and the positioning clip of the bracket according to the embodiment of the present invention. FIG. 6B is a schematic perspective view illustrating the assembled structure of the fixing seat, the first clamping block and the positioning clip as shown in FIG. 6A. Please refer to FIGS. 2A, 2B, 6A and 6B. In an embodiment, the bracket 1 is equipped with a mechanism for avoiding the detachment of the fixing seat 10 from the first clamping block 30. This mechanism comprises the positioning clip 50, the first protrusion post 11 of the fixing seat 10 and the positioning structure 33 of the first clamping block 30. As mentioned above, the ring-shaped groove 12 is formed in the first protrusion post 11 of the fixing seat 10, and the positioning recess 33 is located at the side of the first clamping block 30 facing the clamping space 110. In addition, the positioning structure 33 comprises an arc-shaped main body with two second tapped holes 35. The second tapped hole 35 has an internal thread structure. In an embodiment, the positioning clip 50 comprises an arc-shaped main body 51 and two fastening parts 52. The two fastening parts 52 are located at two ends of the arc-shaped main body 51. Moreover, each fastening part 52 comprises a second through-hole 53. After two screws 54 are respectively penetrated through the corresponding second through-holes 53 of the positioning clip 50 and tightened into the corresponding second tapped holes 35, the ring-shaped groove 12 of the first protrusion post 11 is locked between the positioning clip 50 and the positioning structure 33 (see FIG. 6B). Consequently, the fixing seat 10 is not detached from the first clamping block 30.

As mentioned above, the monitoring device 2 can be installed on a wall surface or an object. Moreover, the installation angle or orientation of the monitoring device 2 can be adjusted by simply loosening the main screw 90. After the monitoring device 2 is adjusted to the proper or desired angle or orientation, the positions of the components of the bracket 1 can be fixed after the main screw 90 is tightened again. The associated operations will be described as follows.

Firstly, in order to adjust the orientation of the monitoring device 2, the first clamping block 30 and the second clamping block 40 are rotated with respect to the fixing seat 10. For example, the first clamping block 30 and the second clamping block 40 are rotated in the direction A as shown in FIG. 1 (or in the reverse direction). The purpose of adjusting the orientation of the monitoring device 2 can be achieved through the cooperation of the fixing seat 10, the sliding block 60, the first clamping block 30, the second clamping block 40, the main screw 90 and the position-limiting element 100.

Figure 5A:
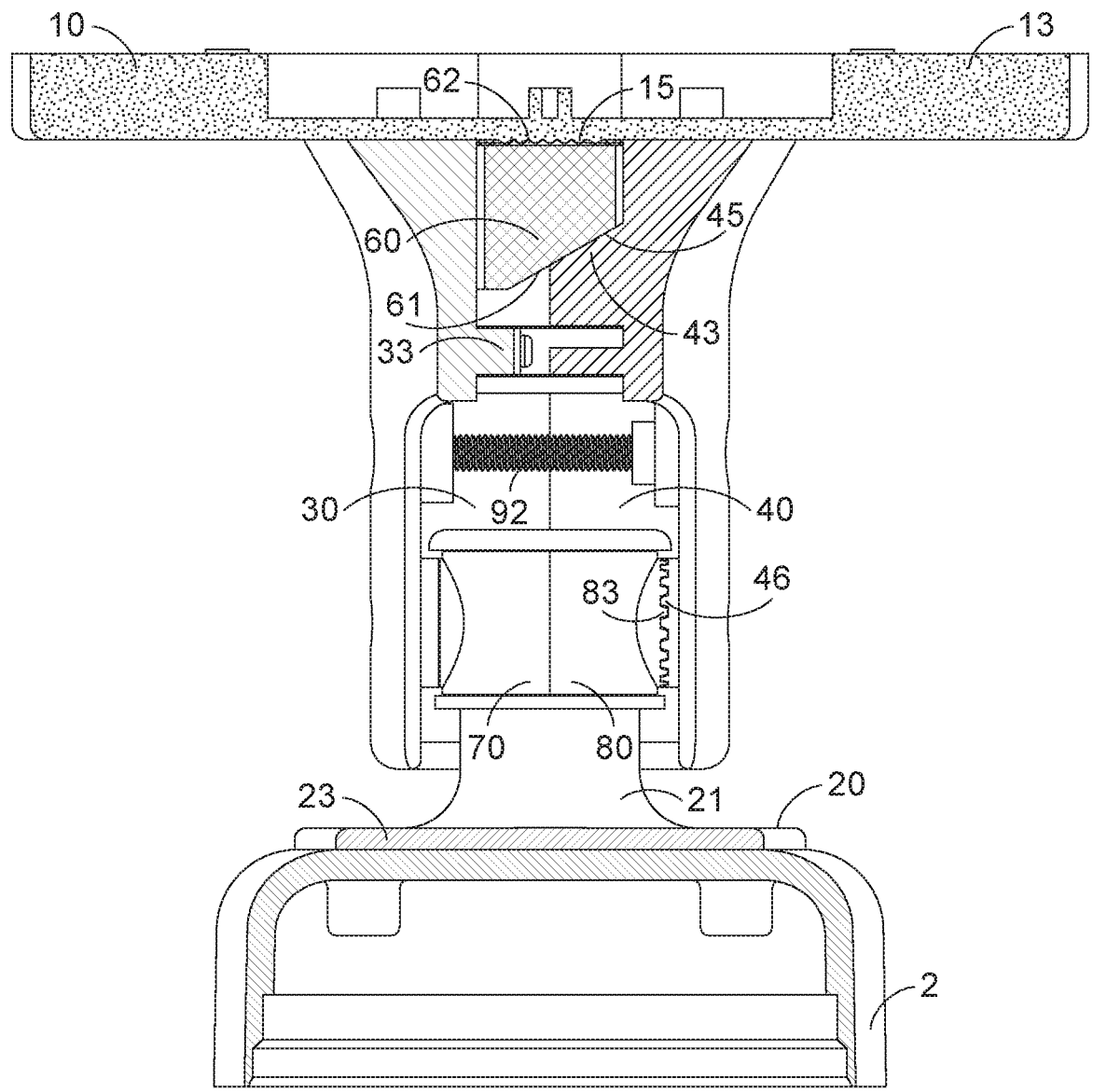
FIG. 5A is a schematic cross-sectional view illustrating the bracket as shown in FIG. 1 and taken along the line 5A-5A.
Figure 5B:
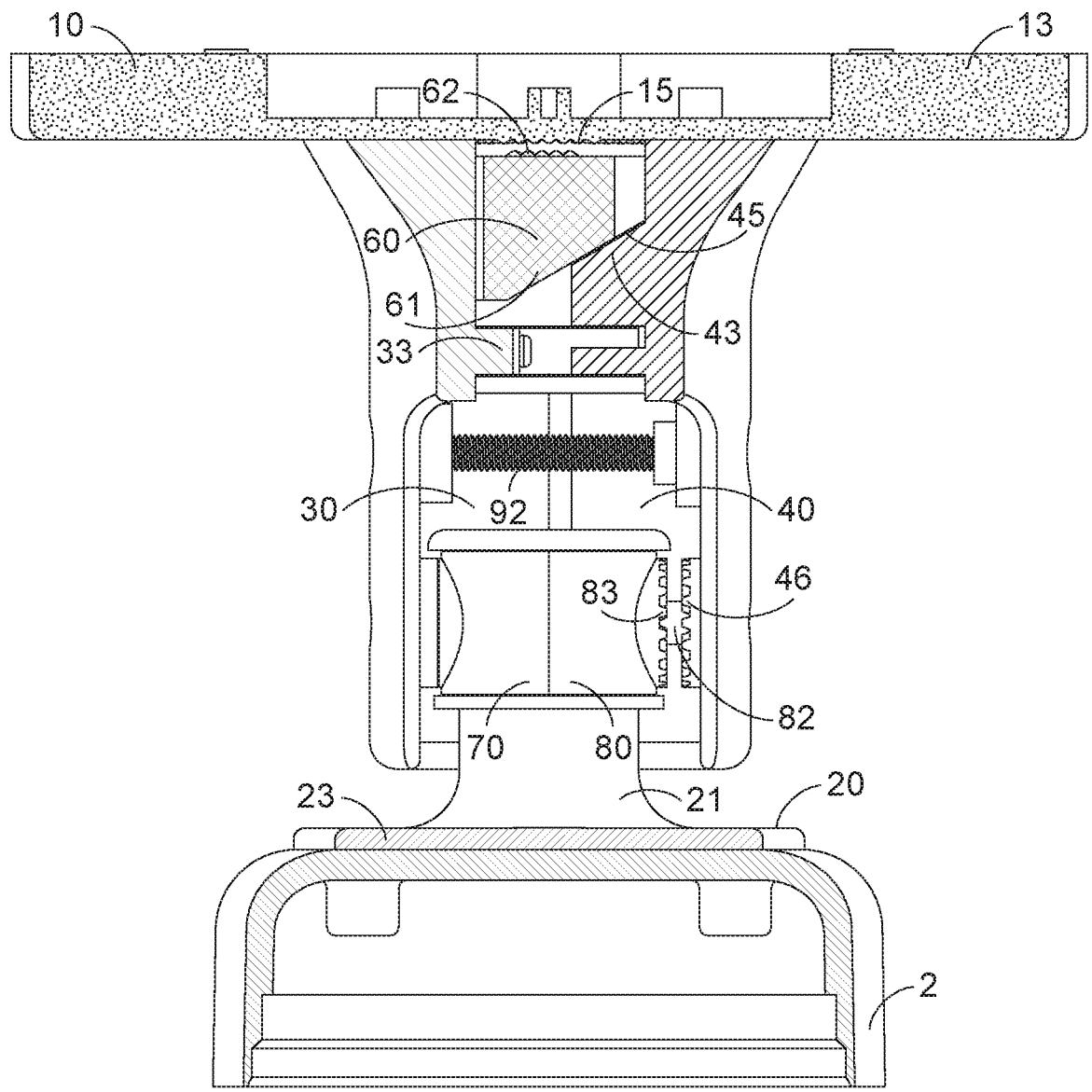
FIG. 5B is a schematic cross-sectional view illustrating the bracket as shown in FIG. 5A while the bracket is adjusted.

FIG. 5A is a schematic cross-sectional view illustrating the bracket as shown in FIG. 1 and taken along the line 5A-5A. FIG. 5B is a schematic cross-sectional view illustrating the bracket as shown in FIG. 5A while the bracket is adjusted. Please refer to FIGS. 1, 4, 5A and 5B. The sliding block 60 is disposed within the clamping space 110 and sheathed around the first protrusion post 11 of the fixing seat 10. The sliding block 60 comprises a slant surface 61 and a first saw-tooth structure 62. The first saw-tooth structure 62 is aligned with the first base 13. Correspondingly, the first base 13 of the fixing seat 10 comprises a second saw-tooth structure 15. That is, the second saw-tooth structure 15 is aligned with the first saw-tooth structure 62. As mentioned above, the guiding structure 43 is located at the side of the second clamping block 40 facing the clamping space 110. In addition, the slant surface 61 of the sliding block 60 is contacted with the guiding structure 43 of the second clamping block 40.

Please refer to FIG. 5A. When the thread part 92 of the main screw 90 is tightened into the first tapped hole 41, the first clamping block 30 and the second clamping block 40 are fixed on each other, and the first protrusion post 11 of the fixing seat 10 and the sliding block 60 are clamped between the first clamping block 30 and the second clamping block 40. Under this circumstance, the first saw-tooth structure 62 of the sliding block 60 and the second saw-tooth structure 15 of the first base 13 are engaged with each other, and the slant surface 61 of the sliding block 60 is upwardly pushed by the guiding structure 43 of the second clamping block 40. Consequently, the first saw-tooth structure 62 and the second saw-tooth structure 15 are continuously engaged with each other.

Please refer to FIG. 5B. When the head part 91 of the main screw 90 is rotated to a certain extent by the user in the reverse direction, the thread part 92 of the main screw 90 is disengaged from the internal thread structure 44 of the first tapped hole 41. That is, the thread part 92 of the main screw 90 is not tightened into the first tapped hole 41. Meanwhile, the second clamping block 40 is detached from the first clamping block 30, and the slant surface 61 of the sliding block 60 is moved downwardly along the guiding structure 43 of the second clamping block 40. In addition, the first saw-tooth structure 62 of the sliding block 60 and the second saw-tooth structure 15 of the first base 13 are disengaged from each other. In this situation, the first clamping block 30 and the second clamping block 40 can be rotated with respect to the fixing seat 10. For example, the first clamping block 30 and the second clamping block 40 are rotated in the direction A as shown in FIG. 1 (or in the reverse direction). As the first clamping block 30 and the second clamping block 40 are rotated, the adapter seat 20 installed between the first clamping block 30 and the second clamping block 40 is correspondingly rotated. Since the monitoring device 2 is rotated with the adapter seat 20, the orientation or angle of the monitoring device 2 is adjusted.

Secondly, by adjusting the included angle between the adapter seat 20 and the first clamping block 30 and the included angle between the adapter seat 20 and the second clamping block 40, the purpose of adjusting the orientation of the monitoring device 2 through the bracket 1 can be also achieved. For example, when the adapter seat 20 is rotated in the direction B as shown in FIG. 1 (or in the reverse direction), the monitoring device 2 can be correspondingly rotated or swung. The purpose of adjusting the orientation of the monitoring device 2 can be achieved through the cooperation of the first clamping block 30, the second clamping block 40, the main screw 90, the position-limiting element 100, the first clamping piece 70, the second clamping piece 80 and the adapter seat 20.

Please refer to FIGS. 1, 2A, 2B, 7, 8A and 8B again. As shown in these drawings, a third saw-tooth structure 46 is formed on an outer periphery of the second pivot hole 42 of the second clamping block 40. Particularly, the third saw-tooth structure 46 is formed on the outer periphery of the second pivot hole 42 and aligned with the second clamping piece 80. The second clamping piece 80 is equipped with a fourth saw-tooth structure 83 corresponding to the third saw-tooth structure 46. The fourth saw-tooth structure 83 is formed on an outer periphery of the second pivotal shaft 82 and aligned with the third saw-tooth structure 46.

Please refer to FIG. 8A. When the thread part 92 of the main screw 90 is tightened into the first tapped hole 41, the first clamping block 30 and the second clamping block 40 are fixed on each other, and the first clamping piece 70, the second protrusion post 21 of the adapter seat 20 and the second clamping piece 80 are clamped between the first clamping block 30 and the second clamping block 40. Under this circumstance, the third saw-tooth structure 46 of the second clamping block 40 and the fourth saw-tooth structure 83 of the second clamping piece 80 are engaged with each other.

Please refer to FIG. 8B. When the head part 91 of the main screw 90 is rotated to a certain extent by the user in the reverse direction, the thread part 92 of the main screw 90 is disengaged from the internal thread structure 44 of the first tapped hole 41. That is, the thread part 92 of the main screw 90 is not tightened into the first tapped hole 41. Meanwhile, the second clamping block 40 is detached from the second clamping piece 80, and the third saw-tooth structure 46 of the second clamping block 40 and the fourth saw-tooth structure 83 of the second clamping piece 80 are disengaged from each other. In this situation, the adapter seat 20 can be rotated with respect to the first pivotal shaft 72 or the second pivotal shaft 82 (i.e., the rotation center). For example, the adapter seat 20 is rotated in the direction B as shown in FIG. 1 (or in the reverse direction). As the adapter seat 20 is rotated, the included angle between the adapter seat 20 and the first clamping block 30 and the included angle between the adapter seat 20 and the second clamping block 40 are adjusted. As mentioned above, the monitoring device 2 is connected with the adapter seat 20. Since the monitoring device 2 is rotated with the adapter seat 20, the orientation or angle of the monitoring device 2 is adjusted.

Thirdly, by rotating the adapter seat 20 with respect to the first clamping piece 70 and the second clamping piece 80, the purpose of adjusting the orientation of the monitoring device 2 can be also achieved. For example, when the adapter seat 20 is rotated in the direction C as shown in FIG. 1 (or in the reverse direction), the monitoring device 2 can be correspondingly rotated. The purpose of adjusting the orientation of the monitoring device 2 can be achieved through the cooperation of the first clamping block 30, the second clamping block 40, the main screw 90, the position-limiting element 100, the first clamping piece 70, the second clamping piece 80 and the adapter seat 20.

Please refer to FIGS. 1, 2A, 2B, 7, 8A, 8B and 9 again. As shown in these drawings, a fifth saw-tooth structure 22 is formed on an outer surface of the second protrusion post 21 of the adapter seat 20 to be contacted with the first clamping piece 70 or the second clamping piece 80. Correspondingly, a sixth saw-tooth structure is formed on a surface of the first clamping part 71 of the first clamping piece 70 or a surface of the second clamping part 81 of the second clamping piece 80 so as to be contacted with the second protrusion post 21. In this embodiment, the sixth saw-tooth structure 84 is formed on the second clamping part 81 of the second clamping piece 80.

Please refer to FIG. 8A. When the thread part 92 of the main screw 90 is tightened into the first tapped hole 41, the first clamping block 30 and the second clamping block 40 are fixed on each other, and the first clamping piece 70, the second protrusion post 21 of the adapter seat 20 and the second clamping piece 80 are clamped between the first clamping block 30 and the second clamping block 40. Under this circumstance, the fifth saw-tooth structure 22 on the second protrusion post 21 and the sixth saw-tooth structure 84 on the second clamping part 81 of the second clamping piece 80 are engaged with each other.

Please refer to FIG. 8B. When the head part 91 of the main screw 90 is rotated to a certain extent by the user in the reverse direction, the thread part 92 of the main screw 90 is disengaged from the internal thread structure 44 of the first tapped hole 41. That is, the thread part 92 of the main screw 90 is not tightened into the first tapped hole 41. Meanwhile, the second protrusion post 21 is detached from the second clamping piece 80, and the fifth saw-tooth structure 22 on the second protrusion post 21 and the sixth saw-tooth structure 84 on the second clamping part 81 of the second clamping piece 80 are disengaged from each other. In this situation, the adapter seat 20 can be rotated with respect to the first clamping piece 70 or the second clamping piece 80. For example, the adapter seat 20 is rotated in the direction C as shown in FIG. 1 (or in the reverse direction). As mentioned above, the monitoring device 2 is connected with the adapter seat 20. Since the monitoring device 2 is rotated with the adapter seat 20, the orientation or angle of the monitoring device 2 is adjusted.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A bracket, comprising:
 a fixing seat comprising a first protrusion post and a first base;
 an adapter seat comprising a second protrusion post and a second base;
 a first clamping block comprising a first through-hole and a first pivot hole;
 a second clamping block comprising a first tapped hole and a second pivot hole, wherein a clamping space is defined by the first clamping block and the second clamping block collaboratively;

a first clamping piece disposed within the clamping space, wherein the first clamping piece comprises a first clamping part and a first pivotal shaft, and the first pivotal shaft is inserted into the first pivot hole;

a second clamping piece disposed within the clamping space, wherein the second clamping piece comprises a second clamping part and a second pivotal shaft, and the second pivotal shaft is inserted into the second pivot hole;

a main screw penetrated through the first through-hole and tightened into the first tapped hole, wherein the main screw comprises a head part, a thread part and a limiting part, and the thread part is arranged between the head part and the limiting part; and a position-limiting element, wherein when the position-limiting element is locked on the limiting part of the main screw, the main screw is not detached from the first tapped hole, wherein the first protrusion post is clamped between the first clamping block and the second clamping block, and the second protrusion post is clamped between the first clamping part and the second clamping part.

2. The bracket according to claim 1, wherein after the limiting part of the main screw is penetrated through the first tapped hole, the limiting part of the main screw is exposed outside the second clamping block.

3. The bracket according to claim 2, wherein the limiting part of the main screw is a ring-shaped recess, and the position-limiting element is an E clip.

4. The bracket according to claim 2, wherein the limiting part of the main screw is an insertion hole, and the position-limiting element is a bar.

5. The bracket according to claim 1, wherein the bracket further comprises a positioning clip, the first protrusion post comprises a ring-shaped groove, and the first clamping block comprises a positioning structure, wherein the ring-shaped groove is locked between the positioning clip and the positioning structure.

6. The bracket according to claim 5, wherein the positioning structure comprises two second tapped holes, and the positioning clip comprises an arc-shaped main body and two fastening parts, wherein the two fastening parts are respectively located at two ends of the arc-shaped main body, and each fastening part comprises a second through-hole, wherein after two screws are respectively penetrated through the corresponding second through-holes and tightened into the corresponding second tapped holes, the ring-shaped groove is locked between the positioning clip and the positioning structure.

7. The bracket according to claim 1, wherein the bracket further comprises a sliding block that is sheathed around the first protrusion post, and the sliding block comprises a slant surface and a first saw-tooth structure, wherein the first base comprises a second saw-tooth structure, the second clamping block further comprises a guiding structure, and the slant surface of the sliding block is contacted with the guiding structure, wherein when the thread part of the main screw is tightened into the first tapped hole, the first saw-tooth structure and the second saw-tooth structure are engaged with each other, wherein when the thread part of the main screw is not tightened into the first tapped hole, the first saw-tooth structure and the second saw-tooth structure are disengaged from each other.

8. The bracket according to claim 1, wherein the second clamping block further comprises a third saw-tooth structure, and the third saw-tooth structure is formed on an outer periphery of the second pivot hole, wherein the second clamping piece further comprises a fourth saw-tooth structure, and the fourth saw-tooth structure is formed on an outer periphery of the second pivotal shaft, wherein when the thread part of the main screw is tightened into the first tapped hole, the third saw-tooth structure and the fourth saw-tooth structure are engaged with each other, wherein when the thread part of the main screw is not tightened into the first tapped hole, the third saw-tooth structure and the fourth saw-tooth structure are disengaged from each other.

9. The bracket according to claim 1, wherein a fifth saw-tooth structure is formed on an outer surface of the second protrusion post that is contacted with the first clamping piece or the second clamping piece, and a sixth saw-tooth structure is formed on a surface of the first clamping part of the first clamping piece or a surface of the second clamping part of the second clamping piece that is contacted with the second protrusion post, wherein when the thread part of the main screw is tightened into the first tapped hole, the fifth saw-tooth structure and the sixth saw-tooth structure are engaged with each other, wherein when the thread part of the main screw is not tightened into the first tapped hole, the fifth saw-tooth structure and the sixth saw-tooth structure are disengaged from each other.

10. The bracket according to claim 1, wherein the first protrusion post and the second protrusion post are hollow posts, and the first protrusion post and the second protrusion post are in communication with each other through the clamping space.

* * * * *